United States Patent
Na et al.

(10) Patent No.: US 12,202,501 B2
(45) Date of Patent: Jan. 21, 2025

(54) SYSTEM AND METHOD FOR LIMITING MAXIMUM ACCELERATION OF A MOTOR DRIVEN VEHICLE

(71) Applicants: HYUNDAI MOTOR COMPANY, Seoul (KR); KIA CORPORATION, Seoul (KR)

(72) Inventors: Chang Eun Na, Icheon-si (KR); Hyun Seok Jang, Daegu (KR); Byung Jun Sung, Anyang-si (KR); Seung Ho Choi, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 222 days.

(21) Appl. No.: 17/945,237

(22) Filed: Sep. 15, 2022

(65) Prior Publication Data

US 2023/0080296 A1    Mar. 16, 2023

(30) Foreign Application Priority Data

Sep. 15, 2021   (KR) .................. 10-2021-0122863

(51) Int. Cl.
*B60W 50/12*     (2012.01)
*B60W 30/14*     (2006.01)
*B60W 40/09*     (2012.01)
*B60W 50/10*     (2012.01)

(52) U.S. Cl.
CPC ............ *B60W 50/12* (2013.01); *B60W 40/09* (2013.01); *B60W 50/10* (2013.01); *B60W 2510/084* (2013.01); *B60W 2540/30* (2013.01)

(58) Field of Classification Search
CPC ..................................................... B60W 50/12
See application file for complete search history.

(56) References Cited

U.S. PATENT DOCUMENTS

| | | | |
|---|---|---|---|
| 2003/0216847 A1* | 11/2003 | Bellinger | F16H 61/66 701/72 |
| 2009/0115246 A1* | 5/2009 | Yanagida | B60L 3/102 303/144 |
| 2009/0216415 A1* | 8/2009 | Iwatsuki | B60W 30/188 701/70 |
| 2014/0336890 A1* | 11/2014 | Kresse | F16H 61/68 701/60 |
| 2015/0005988 A1* | 1/2015 | Cox | B60L 15/2009 701/3 |
| 2015/0134219 A1* | 5/2015 | Poulin | B60W 30/18027 701/70 |
| 2015/0210282 A1* | 7/2015 | Fairgrieve | F16H 61/0213 701/93 |

(Continued)

*Primary Examiner* — Long T Tran
(74) *Attorney, Agent, or Firm* — Lempia Summerfield Katz LLC

(57) ABSTRACT

Disclosed are a system and a method for limiting the maximum acceleration of a motor driven vehicle. The system and method can estimate an acceleration from a speed of a motor driven vehicle, and limit the maximum acceleration of the motor driven vehicle to a level to exert constant traveling performance regardless of the total weight of the vehicle and road gradient conditions using the estimated acceleration as a control variable for limiting the maximum acceleration, thereby improving the ride comfort and the fuel efficiency.

15 Claims, 6 Drawing Sheets

(56) References Cited

U.S. PATENT DOCUMENTS

| | | | | |
|---|---|---|---|---|
| 2016/0194002 A1* | 7/2016 | Kelly | ............... | B60W 10/18 |
| | | | | 701/93 |
| 2017/0110021 A1* | 4/2017 | Skagius | ............ | B60K 35/22 |
| 2017/0305431 A1* | 10/2017 | Karlsson | ............ | B60W 10/08 |
| 2018/0208184 A1* | 7/2018 | Sugai | ............ | B60L 15/2009 |
| 2020/0317194 A1* | 10/2020 | Yan | ............ | B60W 30/12 |
| 2021/0190521 A1* | 6/2021 | Mendes | ............ | G08G 1/096827 |

* cited by examiner

SYSTEM AND METHOD FOR LIMITING MAXIMUM ACCELERATION OF A MOTOR DRIVEN VEHICLE

CROSS-REFERENCE TO RELATED APPLICATION

This application claims under 35 U.S.C. § 119(a) the benefit of and priority to Korean Patent Application No. 10-2021-0122863 filed on Sep. 15, 2021, the entire contents of which are incorporated herein by reference.

BACKGROUND

(a) Technical Field

The present disclosure relates to a system and a method for limiting the maximum acceleration of a motor driven vehicle.

(b) Background Art

As is well known, a hybrid electric vehicle, an electric vehicle, a hydrogen fuel cell vehicle, etc. are equipped with an electric motor as a driving power source, and these vehicles are referred to as a motor driven vehicle.

Because a motor provides a quick responsiveness to an input, the maximum torque of the motor can be promptly output upon receipt of an acceleration input from the motor driven vehicle. In addition, the motor driven vehicle has the characteristic that an acceleration at the beginning of acceleration increases faster than that of a conventional internal combustion engine vehicle. As such, after having started the motor driven vehicle, the motor can reach at its maximum torque much faster than the conventional engine can.

This characteristic can be a marketing point for a personal vehicle but may be a negative factor to a commercial vehicle such as a bus in that it may threaten the safety of passengers. In addition, the rapid acceleration at the beginning of acceleration not only causes a reduction in ride comfort but also adversely affects the fuel efficiency.

Therefore, as a method for limiting the acceleration of the motor driven vehicle, a method for limiting an increase/decrease rate of a motor torque, a method for limiting the maximum torque of a motor, etc. can be applied.

However, for the commercial vehicle, since a total weight of the vehicle varies depending on the number of passengers and loads, the method for limiting the increase/decrease rate of the motor torque or limiting the maximum torque of the motor are not appropriate, and in particular, the uphill traveling performance of the vehicle can be significantly lowered in case of limiting the maximum torque of the motor.

The above information disclosed in this Background section is only for enhancement of understanding of the background of the disclosure and accordingly it may include information that does not form the prior art that is already known to a person of ordinary skill in the art.

SUMMARY

The present disclosure provides a system and a method for limiting the maximum acceleration of a motor driven vehicle. In particular, the system and method can estimate a acceleration based on a speed of a motor driven vehicle, and limit the maximum acceleration of the motor driven vehicle to a level at which a constant traveling performance is achieved regardless of the total weight of the vehicle and road gradient conditions using the estimated acceleration as a control variable for limiting the maximum acceleration, thereby improving the ride comfort and improving the fuel efficiency.

In one embodiment of the present disclosure, a system for limiting the maximum acceleration of a motor driven vehicle includes: a wheel speed sensor configured to detect a vehicle speed; an accelerator pedal position sensor configured to detect an amount of accelerator pedal depression; and a control unit configured to estimate a acceleration based on the vehicle speed detected by the wheel speed sensor, and to set, as a motor torque, an acceleration limit torque for limiting the estimated acceleration to a target acceleration when the estimated acceleration is equal to or higher than a reference acceleration.

In another embodiment, the control unit may comprise an acceleration estimator configured to estimate the acceleration based on the vehicle speed detected by the wheel acceleration sensor; an acceleration limit torque calculation unit configured to determine an acceleration limit torque for limiting the maximum acceleration to the target acceleration based on the estimated acceleration; a driver demand torque determination unit configured to determine a driver demand torque based on the vehicle speed detected by the wheel speed sensor and the amount of accelerator pedal depression detected by the accelerator pedal position sensor; and an acceleration limit control determination unit configured to determine that the vehicle enters into a maximum acceleration limit control mode when the acceleration estimated by the acceleration estimator is equal to or higher than the reference acceleration.

The acceleration limit torque calculation unit is configured to determine the acceleration limit torque using a disturbance observer. In particular, the disturbance observer calculates a torque, based on a disturbance observation using the acceleration estimated by the acceleration estimator, as a control variable.

In one embodiment, the acceleration limit torque calculation unit comprises: the disturbance observer configured to determine a torque based on the disturbance observation using the acceleration estimated by the acceleration estimator, a torque instruction value, and a Q-filter used to estimate the disturbance; a feedforward torque determination unit configured to determine a feedforward torque using the reference acceleration; and a feedback torque determination unit configured to determine a feedback torque using the acceleration estimated by the acceleration estimator.

Therefore, the acceleration limit torque calculation unit can be configured to determine the acceleration limit torque by summing the disturbance observation based torque determined by the disturbance observer, the feedforward torque determined by the feedforward torque determination unit, and the feedback torque determined by the feedback torque determination unit.

The driver demand torque determination unit is configured to determine the driver demand torque from a preset map table based on the vehicle speed detected by the wheel speed sensor and the amount of accelerator pedal depression detected by the accelerator pedal position sensor.

The acceleration limit control determination unit is configured to determine that the vehicle enters into the maximum acceleration limit control mode when the acceleration estimated by the acceleration estimator is equal to or higher than the reference acceleration, and to determine the maximum acceleration limit control mode is released when the estimated acceleration is lower than the reference acceleration.

In addition, the control unit is configured to determine, as a motor instruction torque, a torque having a smaller torque among the acceleration limit torque determined by the acceleration limit torque calculation unit and the driver demand torque determined by the driver demand torque determination unit.

In another embodiment of the present disclosure, a method for limiting the maximum acceleration of a motor driven vehicle includes: detecting a vehicle speed of the motor driven vehicle; estimating a acceleration upon acceleration from the detected vehicle speed; and setting, as a motor torque, an acceleration limit torque for limiting the estimated acceleration to a target acceleration when the estimated acceleration is equal to or higher than a reference acceleration.

The estimating of the acceleration estimates the acceleration through a predetermined calculation equation from the vehicle speed detected by a wheel speed sensor in a Kalman filter constituting an acceleration estimator.

The acceleration limit torque can be determined by summing a torque based on a disturbance observation determined by a disturbance observer, a feedforward torque determined by a feedforward torque determination unit, and a feedback torque determined by a feedback torque determination unit.

The method for limiting the maximum acceleration according to the present disclosure further includes calculating a driver demand torque; determining an entry of the maximum acceleration limit control mode in which the maximum acceleration is limited when the estimated acceleration is equal to or higher than the reference acceleration; and comparing the acceleration limit torque with the driver demand torque.

When the acceleration limit torque is smaller than the driver demand torque, the acceleration limit torque is set as a motor torque for limiting the maximum acceleration. When the estimated acceleration is lower than the reference acceleration, the release of the maximum acceleration limit control mode is determined, or the driver demand torque is smaller than the acceleration limit torque, the driver demand torque is set as a motor torque for limiting the maximum acceleration.

Through the above configuration, the present disclosure provides the following effects.

First, it is possible to estimate a acceleration from a speed of a motor driven vehicle, and limit the maximum acceleration of the motor driven vehicle to a level to provide a constant traveling performance regardless of the total weight of the vehicle and road gradient conditions using of the estimated acceleration as the control variable for limiting the maximum acceleration, thereby preventing the sudden acceleration undermining the safety of passengers for the commercial vehicle and improving the ride comfort.

Second, it is possible to limit the maximum acceleration, such as limiting the maximum acceleration to the target acceleration, to reduce the motor torque according to the maximum acceleration limit, thereby improving the fuel efficiency.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE DRAWINGS

The above and other features of the present disclosure are now described in detail with reference to certain exemplary examples thereof illustrated in the accompanying drawings which are given herein below by way of illustration only, and thus are not limitative of the present disclosure, and wherein.

Figure 1:
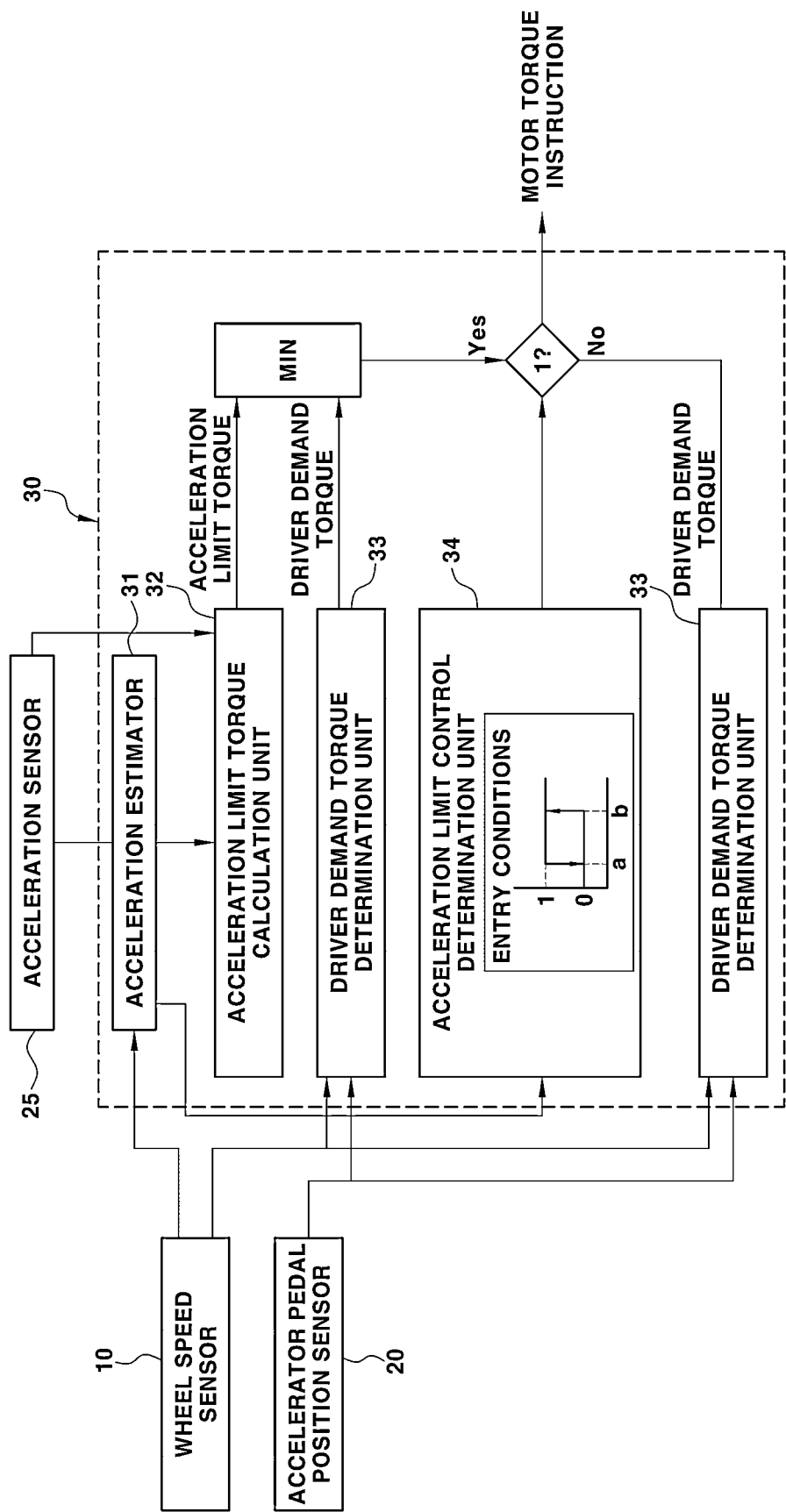
FIG. 1 is a diagram showing a system for limiting the maximum acceleration of a motor driven vehicle according to one embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes should be determined in section by the particular intended application and use environment.

In the figures, reference numbers refer to the same or equivalent sections of the present disclosure throughout the several figures of the drawing.

DETAILED DESCRIPTION

Hereinafter, some embodiments of the present disclosure are described in detail with reference to the accompanying drawings.

When a component, device, element, or the like of the present disclosure is described as having a purpose or performing an operation, function, or the like, the component, device, or element should be considered herein as being "configured to" meet that purpose or to perform that operation or function.

The operations of the method or the algorithm described in connection with the forms disclosed herein may be embodied directly in a hardware (e.g., a processor) or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, a CD-ROM.

Also, the terms, such as 'unit' or 'module', etc., should be understood as a unit that processes at least one function or operation and that may be embodied in a hardware manner (e.g., a processor), a software manner, or a combination of the hardware manner and the software manner.

FIG. 1 is a diagram showing the configuration of a system for limiting the maximum acceleration of a motor driven vehicle according to one embodiment of the present disclosure.

As shown in FIG. 1, the system for limiting the maximum acceleration of a motor driven vehicle includes: a wheel speed sensor 10 configured to detect a vehicle speed, an accelerator pedal position sensor 20 configured to detect an amount of an acceleration pedal depression, and a control unit 30 configured to set a motor torque for limiting the maximum acceleration of a motor driven vehicle to a target acceleration.

In particular, the control unit 30 is configured to estimate a acceleration from the vehicle speed detected by the wheel speed sensor 10, and instruct, as the motor torque, an acceleration limit torque for limiting the maximum acceleration of the motor driven vehicle to the target acceleration when the estimated acceleration is equal to or higher than a reference acceleration.

In one embodiment, the control unit 30 is configured to estimate the acceleration from the vehicle speed detected by the wheel speed sensor 10, and instruct, as the motor torque, a smaller torque of the acceleration limit torque for limiting the maximum acceleration of the motor driven vehicle to the target acceleration and the driver demand torque when the estimated acceleration is equal to or higher than the reference acceleration.

To this end, as shown in FIG. 1, the control unit 30 can be configured to include an acceleration estimator 31 configured to estimate the acceleration from the vehicle speed detected by the wheel speed sensor 10, an acceleration limit torque calculation unit 32 configured to determine the acceleration limit torque for limiting the maximum acceleration of the motor driven vehicle to the target acceleration based on the estimated acceleration, a driver demand torque determination unit 33 configured to determine a driver demand torque based on the vehicle speed detected by the wheel speed sensor 10 and an amount of accelerator pedal depression detected by the accelerator pedal position sensor 20, and an acceleration limit control determination unit 34 configured to determine that the vehicle enters into a maximum acceleration limit control mode when the acceleration estimated by the acceleration estimator 31 is equal to or higher than the reference acceleration. In another form, when the acceleration estimated by the acceleration estimator 31 is equal to or higher than the reference acceleration, the acceleration limit control determination unit 34 determines that the maximum acceleration limit control mode is desired, and the vehicle is controlled under the maximum acceleration limit control.

The acceleration estimator 31 can be configured as a known Kalman filter having a predetermined calculation equation to estimate the vehicle speed detected by the wheel speed sensor 10 with the acceleration.

Figure 2:
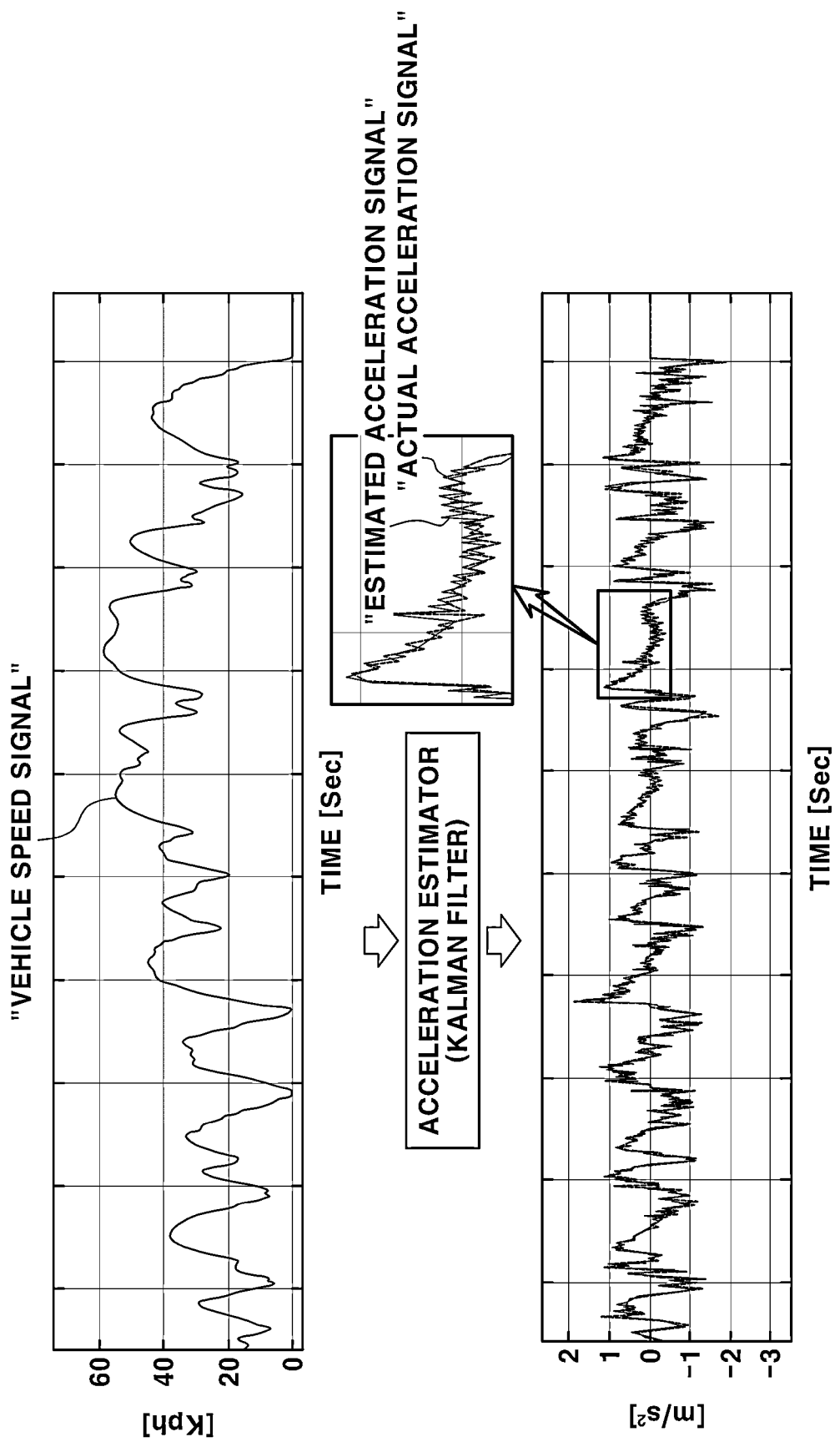
FIG. 2 is graphs showing a test result of estimating a vehicle speed with a acceleration by an acceleration estimator of the system for limiting the maximum acceleration of the motor driven vehicle according to one embodiment of the present disclosure.

FIG. 2 is a graph showing a test result of estimating a vehicle speed with a acceleration by an acceleration estimator in a configuration of the system for limiting the maximum acceleration of the motor driven vehicle according to the present disclosure.

As shown in FIG. 2, when a vehicle speed signal detected by the wheel speed sensor 10 is input to the acceleration estimator 31, an acceleration signal estimated through the calculation equation of the Kalman filter is output from the acceleration estimator 31, and as a comparison result, it could be seen that the estimated acceleration signal almost matches with an actual acceleration signal output from an actual acceleration sensor included in an electronic brake system (EBS) of the vehicle.

Therefore, for a vehicle type not equipped with the acceleration sensor, the acceleration estimated by the acceleration estimator 31 can be easily used as a control variable for controlling the maximum acceleration limit.

The acceleration limit torque calculation unit 32 can be configured to determine the acceleration limit torque in a control method based on a known disturbance observer using the acceleration estimated by the acceleration estimator 31 as the control variable.

In other words, the acceleration limit torque calculation unit 32 can be configured to determine the acceleration limit torque using the control method based on the disturbance observer that observes or estimates a disturbance component to reflect it to the calculation process to enhance an calculation stability of the acceleration limit torque in consideration of the point that the disturbance components, such as friction or mechanical shock applied from the outside, reduce a control stability.

Figure 3:
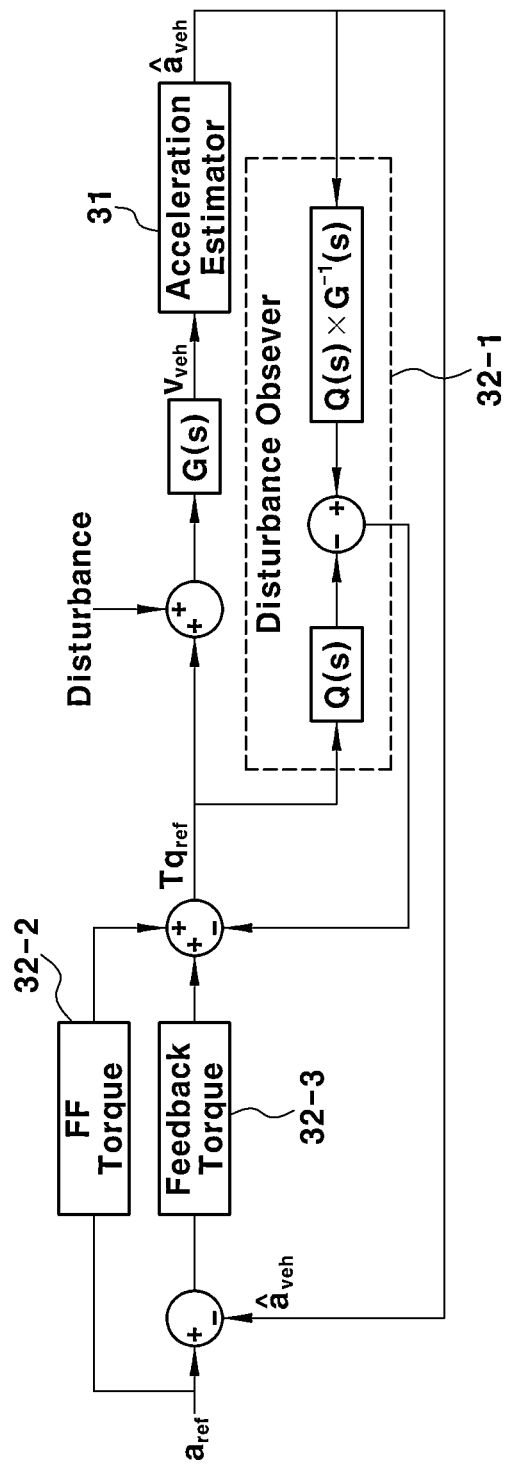
FIG. 3 is a diagram depicting a control configuration of an acceleration limit torque calculation unit in the system for limiting the maximum acceleration of the motor driven vehicle according to one embodiment of the present disclosure.

To this end, as shown in FIG. 3, the acceleration limit torque calculation unit 32 can be configured to include a disturbance observer 32-1 configured to determine a torque $$(Q(s) \cdot Tq_{ref} - Q(s) \cdot \left[\frac{1}{k} \cdot \hat{a}_{veh} + \frac{\tau}{k} \cdot \dot{\hat{a}}_{veh}\right])$$

based on the disturbance observation using an acceleration ($\hat{a}_{veh}$) estimated by the acceleration estimator 31 using a vehicle speed ($V_{veh}$) coming from a vehicle model (G(s)), a torque instruction value ($T_{qref}$), and a Q-filter (Q(s)) used to estimate the disturbance, a feedforward torque determination unit 32-2 configured to determine a feedforward torque $$(\frac{1}{k} \cdot a_{ref} + \frac{\tau}{k} \cdot \dot{a}_{ref})$$

using a reference acceleration ($a_{ref}$), and a feedback torque determination unit 32-3 configured to determine a feedback torque ($K_p \cdot (a_{ref} - \hat{a}_{veh})$) using the acceleration ($\hat{a}_{veh}$) estimated by the acceleration estimator 31 using the vehicle speed ($V_{veh}$) coming from the vehicle model (G(s)).

At this time, when the Q-filter (Q(s)) is expressed as a transfer function, it becomes $$Q(s) = \frac{1}{1 + \tau_1 s},$$

and when the vehicle model (G(s)) is expressed as the transfer function, it becomes $$G(s) = \frac{k}{1 + \tau_2 s}.$$

Therefore, as in Equation 1 below, the acceleration limit torque calculation unit 32 determines the acceleration limit torque ($T_{qref}$) by summing the torque based on the disturbance observation determined by the disturbance observer 32-1, the feedforward torque determined by the feedforward torque determination unit 32-2, and the feedback torque determined by the feedback torque determination unit 32-3.

$$Tq_{ref} = Q(s) \cdot Tq_{ref} - Q(s) \cdot \left[ \frac{1}{k} \cdot \hat{a}_{veh} + \frac{\tau}{k} \cdot \dot{\hat{a}}_{veh} \right] + \frac{1}{k} \cdot a_{ref} + \frac{\tau}{k} \cdot \dot{a}_{ref} + K_p \cdot (a_{ref} - \hat{a}_{veh})$$

Equation 1

In Equation 1 above, k refers to a gain, $\tau$ refers to a time constant, $a_{ref}$ refers to the reference acceleration, $a_{veh}$ refers to the estimated acceleration, and Q(s) refers to the Q-filter expressed as the aforementioned transfer function.

Meanwhile, for the vehicle type equipped with the acceleration sensor, the acceleration limit torque calculation unit 32 can use the acceleration signal detected by the acceleration sensor 25 as the control variable for determining the acceleration limit torque without using the acceleration estimated by the acceleration estimator 31 as the control variable.

The driver demand torque determination unit 33 is configured to determine a driver demand torque from a preset map table based on the vehicle speed detected by the wheel speed sensor 10 and the amount of accelerator pedal depressed detected by the accelerator pedal position sensor 20.

The acceleration limit control determination unit 34 is configured to determine that the vehicle enters into the maximum acceleration limit control mode when the acceleration estimated by the acceleration estimator 31 is equal to or higher than the reference acceleration, and to determine the release of the entry of the maximum acceleration limit control when the estimated acceleration is lower than the reference acceleration.

For example, the acceleration limit control determination unit 34 outputs a flag signal 1 for determining the entry of the maximum acceleration limit control mode when the acceleration estimated by the acceleration estimator 31 is equal to or higher than the reference acceleration, and outputs a flag signal 0 for determining the release of the maximum acceleration limit control mode when the estimated acceleration is lower than the reference acceleration.

Therefore, the control unit 30 may set, as a final motor instruction torque, a torque having a smaller torque among the acceleration limit torque determined by the acceleration limit torque calculation unit 32 and the driver demand torque determined by the driver demand torque determination unit 33 in order to satisfy the driver demand torque even in the acceleration limit control mode.

Here, a method for limiting the maximum acceleration of the motor driven vehicle according to the present disclosure is described as follows.

Figure 4:
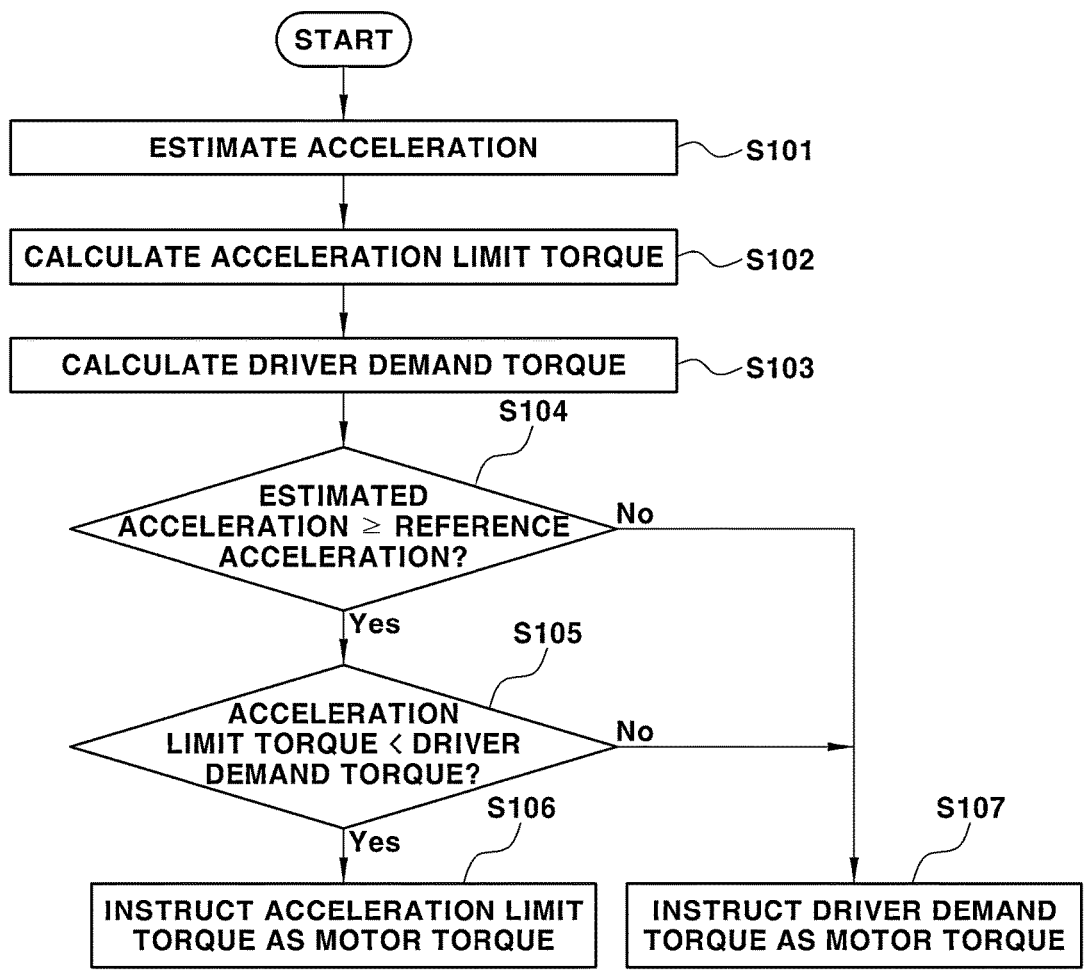
FIG. 4 is a flowchart showing a method for limiting the maximum acceleration of the motor driven vehicle according to one embodiment of the present disclosure.

FIG. 4 is a flowchart showing a method for limiting the maximum acceleration of the motor driven vehicle according to the present disclosure.

First, the acceleration is estimated upon acceleration of the motor driven vehicle (S101).

To this end, the acceleration is estimated from the vehicle speed detected by the wheel speed sensor 10 through the predetermined calculation equation in the Kalman filter constituting the acceleration estimator 31.

Subsequently, the acceleration limit torque is calculated (S102).

To this end, the acceleration limit torque calculation unit 32 of the control unit 30 determines the acceleration limit torque in the control method based on the known disturbance observer using the acceleration estimated by the acceleration estimator 31 as the control variable.

For example, the acceleration limit torque calculation unit 32 determines the acceleration limit torque through Equation 1 above.

Subsequently, the driver demand torque is calculated (S103).

To this end, the driver demand torque determination unit 33 of the control unit 30 determines the driver demand torque from the preset map table based on the vehicle speed detected by the wheel speed sensor 10 and the amount of accelerator pedal depression detected by the accelerator pedal position sensor 20.

Next, in Step S104, it is determined whether the maximum acceleration limit mode is entered.

To this end, the acceleration limit control determination unit 34 of the control unit 30 determines that the vehicle enters into the maximum acceleration limit control mode when the acceleration estimated by the acceleration estimator 31 is equal to or higher than the reference acceleration, and determines the release of the maximum acceleration limit control mode when the estimated acceleration is lower than the reference acceleration.

Subsequently, as the determination result in the step S104, when the entry of the maximum acceleration limit control is determined, the acceleration limit torque determined in the step S102 and the driver demand torque determined in the step S103 are compared (S105).

More specifically, to satisfy the driver demand torque even in the acceleration limit control mode, the control unit 30 compares the acceleration limit torque determined by the acceleration limit torque calculation unit 32 with the driver demand torque determined by the driver demand torque determination unit 33.

As the comparison result, when the acceleration limit torque is lower than the driver demand torque, the acceleration limit torque is set as the motor torque for limiting the maximum acceleration (S106).

On the other hand, as the determination result in the step S104, when the release of the maximum acceleration limit control mode is determined, or as the comparison result in the step S105, when the driver demand torque is lower than the acceleration limit torque, the driver demand torque is set as the motor torque for limiting the maximum acceleration (S107).

As described above, it is possible to estimate a acceleration from a speed of a motor driven vehicle, and limit the maximum acceleration of the motor driven vehicle to a level to exert constant traveling performance regardless of the total weight of the vehicle and road gradient conditions using the estimated acceleration as the control variable for limiting the maximum acceleration, thereby improving the ride comfort and improving the fuel efficiency.

Here, the test example of the method for limiting the maximum acceleration of the motor driven vehicle according to the present disclosure is described as follows.

Figure 5:
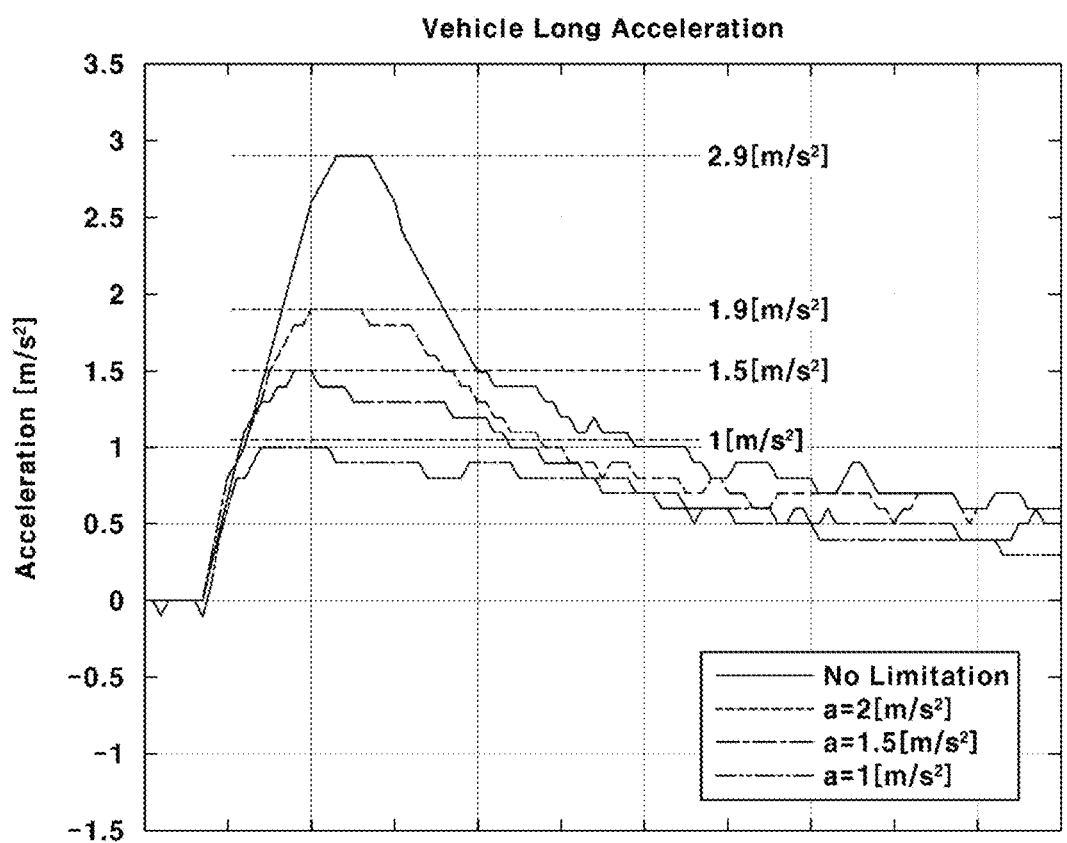
FIGS. 5 and 6 are graphs showing an actual vehicle test result for the method for limiting the maximum acceleration of the motor driven vehicle according to one embodiment of the present disclosure.
Figure 6:
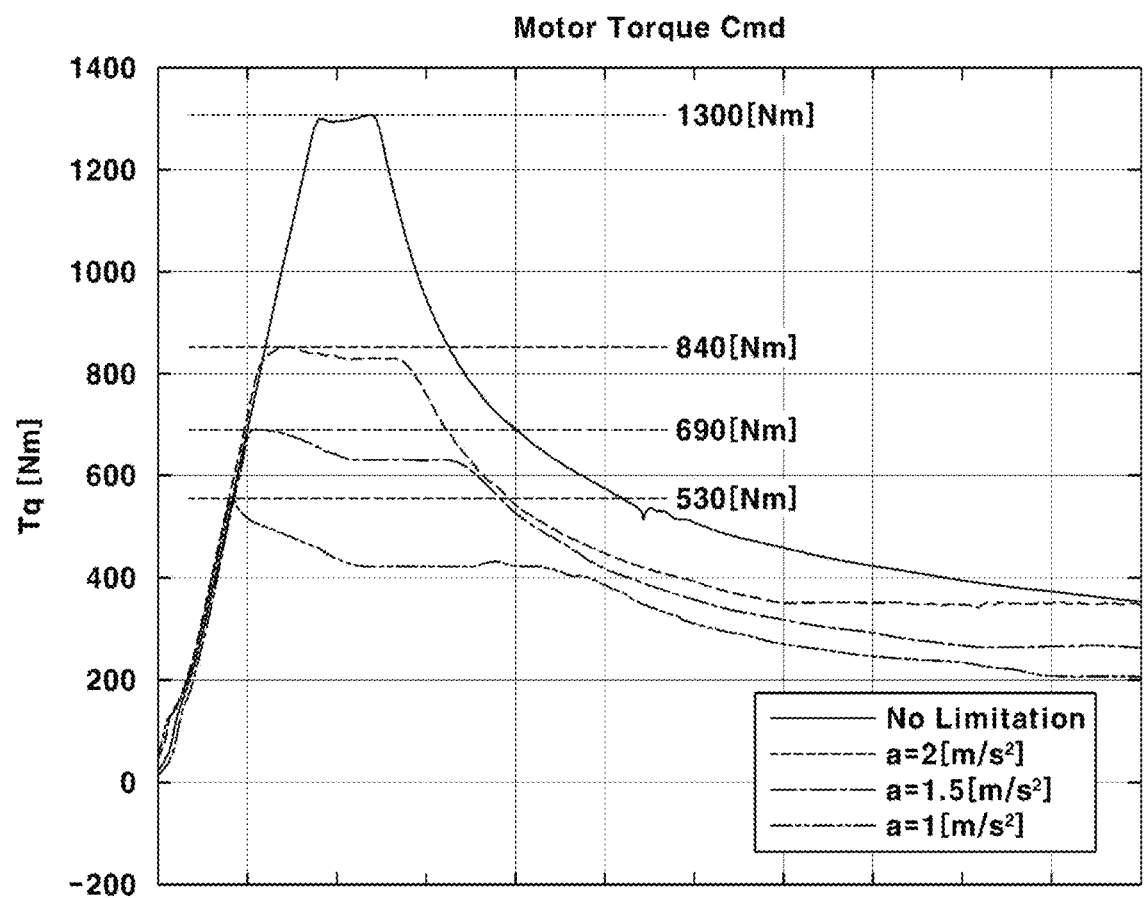

FIG. 5 is an acceleration line diagram showing the result of measuring the maximum acceleration compared to the target acceleration as the actual vehicle test result of the method for limiting the maximum acceleration of the motor driven vehicle according to the present disclosure, and FIG. 6 is a torque line diagram showing the result of measuring the motor torque for limiting the maximum acceleration compared to the target acceleration as the actual vehicle test result of the method for limiting the maximum acceleration of the motor driven vehicle according to the present disclosure.

As shown in FIG. 5, it could be seen that when the target acceleration was not set, the maximum acceleration was 2.9 m/s$^2$, and it was found that when the target acceleration was set to 2 m/s$^2$, the maximum acceleration was 1.9 m/s$^2$; when the target acceleration was set to 1.5 m/s$^2$, the maximum acceleration was 1.5 m/s$^2$; and when the target acceleration was set to 1 m/s$^2$, the maximum acceleration was 1 m/s$^2$, respectively, which proves that the maximum acceleration is limited to the target acceleration.

Therefore, it could be seen that the maximum acceleration can be easily limited to the level to exert the constant traveling performance regardless of the total weight of the vehicle and the road gradient conditions by the method for limiting the maximum acceleration of the motor driven vehicle according to the present disclosure.

As shown in FIG. 6, it was found that when the target acceleration was not set, the motor torque for the maximum acceleration of 2.9 m/s$^2$ was 1300 Nm, thereby reducing the fuel efficiency, but when the target acceleration was set to 2 m/s$^2$, the motor torque for the maximum acceleration of 1.9 m/s$^2$ was 840 Nm; when the target acceleration was set to 1.5 m/s$^2$, the motor torque for the maximum acceleration of 1.5 m/s$^2$ was 690 Nm; and when the target acceleration was set to 1 m/s$^2$, the motor torque for the maximum acceleration of 1 m/s$^2$ was 530 Nm, and therefore, it could be seen that it was possible to improve the fuel efficiency by the method for limiting the maximum acceleration of the motor driven vehicle according to the present disclosure.

While the respective exemplary embodiments of the present disclosure have been described above in detail, the scope of the present disclosure is not limited to the aforementioned respective exemplary embodiments, and various modifications and improvements made by those having ordinary skill in the art using the basic concept of the present disclosure should also be included in the scope of the present disclosure.

What is claimed is:

1. A system for limiting a maximum acceleration of a motor driven vehicle, the system comprising:
    a wheel speed sensor configured to detect a vehicle speed of the motor driven vehicle;
    an accelerator pedal position sensor configured to detect an amount of accelerator pedal depression; and
    a control unit configured to:
        estimate an acceleration based on the vehicle speed detected by the wheel speed sensor, and
        control a motor torque to be an acceleration limit torque, thereby limiting an acceleration of the motor driven vehicle to a target acceleration when the estimated acceleration is equal to or higher than a reference acceleration.

2. The system of claim 1, wherein the control unit comprises:
    an acceleration estimator configured to estimate the acceleration based on the vehicle speed;
    an acceleration limit torque calculation unit configured to determine the acceleration limit torque for limiting the maximum acceleration to the target acceleration based on the estimated acceleration;
    a driver demand torque determination unit configured to determine a driver demand torque based on the vehicle speed detected by the wheel speed sensor and the amount of accelerator pedal depression detected by the accelerator pedal position sensor; and
    an acceleration limit control determination unit configured to determine that the motor driven vehicle enters into a maximum acceleration limit control mode when the acceleration estimated by the acceleration estimator is equal to or higher than the reference acceleration.

3. The system of claim 2, wherein the acceleration limit torque calculation unit is configured to determine the acceleration limit torque in a control method based on a disturbance observer using the acceleration estimated by the acceleration estimator as a control variable.

4. The system of claim 3, wherein the acceleration limit torque calculation unit comprises:
    the disturbance observer configured to determine a torque based on the disturbance observation using the acceleration estimated by the acceleration estimator, a torque instruction value, and a Q-filter used to estimate the disturbance;
    a feedforward torque determination unit configured to determine a feedforward torque using the reference acceleration; and
    a feedback torque determination unit configured to determine a feedback torque using the acceleration estimated by the acceleration estimator.

5. The system of claim 4, wherein the acceleration limit torque calculation unit is configured to calculate the acceleration limit torque by summing the disturbance observation based torque determined by the disturbance observer, the feedforward torque determined by the feedforward torque determination unit, and the feedback torque determined by the feedback torque determination unit.

6. The system of claim 2, wherein the driver demand torque determination unit is configured to determine the driver demand torque from a preset map table based on the vehicle speed detected by the wheel speed sensor and the amount of the accelerator pedal depression detected by the accelerator pedal position sensor.

7. The system of claim 2, wherein the acceleration limit control determination unit is configured to determine the entry of the maximum acceleration limit control mode when the acceleration estimated by the acceleration estimator is equal to or higher than the reference acceleration, and to determine the release of the maximum acceleration limit control mode when the estimated acceleration is lower than the reference acceleration.

8. The system of claim 2, wherein the control unit is configured to determine, as a motor instruction torque, a torque having a smaller torque among the acceleration limit torque determined by the acceleration limit torque calculation unit and the driver demand torque determined by the driver demand torque determination unit.

9. A method for limiting a maximum acceleration of a motor driven vehicle, the method comprising:
    detecting a vehicle speed of the motor driven vehicle;
    estimating an acceleration upon acceleration based on the detected vehicle speed; and
    controlling a motor torque to be an acceleration limit torque, thereby limiting an acceleration of the motor driven vehicle to a target acceleration when the estimated acceleration is equal to or higher than a reference acceleration.

10. The method of claim 9,
    wherein the estimating of the acceleration includes estimating the acceleration through a predetermined calculation equation based on the vehicle speed detected by a wheel speed sensor in a Kalman filter constituting an acceleration estimator.

11. The method of claim 9, wherein the acceleration limit torque is determined by summing a torque based on a disturbance observation determined by a disturbance observer, a feedforward torque determined by a feedforward torque determination unit, and a feedback torque determined by a feedback torque determination unit.

12. The method of claim 9, further comprising:
calculating a driver demand torque;
determining an entry of a maximum acceleration limit control mode when the estimated acceleration is equal to or higher than the reference acceleration; and
comparing the acceleration limit torque with the driver demand torque.

13. The method of claim 12, further comprising:
when the acceleration limit torque is smaller than the driver demand torque, setting the acceleration limit torque as a motor torque for limiting the maximum acceleration.

14. The method of claim 12, further comprising:
when the estimated acceleration is lower than the reference acceleration, the maximum acceleration limit control mode is released, or the driver demand torque is smaller than the acceleration limit torque, setting the driver demand torque as a motor torque for limiting the maximum acceleration.

15. A system for limiting a maximum acceleration of a motor driven vehicle, the system comprising:
a wheel speed sensor configured to detect a vehicle speed of the motor driven vehicle;
an accelerator pedal position sensor configured to detect an amount of accelerator pedal depression; and
a control unit configured to:
estimate an acceleration based on the vehicle speed detected by the wheel speed sensor, and
control a motor torque to be an acceleration limit torque, thereby limiting an acceleration of the motor driven vehicle to a target acceleration when the estimated acceleration is equal to or higher than a reference acceleration,
wherein the control unit is further configured to limit the acceleration of the motor driven vehicle to the target acceleration using the estimated acceleration as a control variable for limiting the acceleration.

* * * * *